(12) United States Patent
Wu et al.

(10) Patent No.: US 11,640,551 B2
(45) Date of Patent: May 2, 2023

(54) METHOD AND APPARATUS FOR RECOMMENDING SAMPLE DATA

(71) Applicant: BEIJING BAIDU NETCOM SCIENCE AND TECHNOLOGY CO., LTD., Beijing (CN)

(72) Inventors: Tian Wu, Beijing (CN); Wensong He, Beijing (CN); Lei Han, Beijing (CN); Xiao Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1297 days.

(21) Appl. No.: 16/102,837

(22) Filed: Aug. 14, 2018

(65) Prior Publication Data

US 2019/0087685 A1  Mar. 21, 2019

(30) Foreign Application Priority Data

Sep. 20, 2017  (CN) .......................... 201710854234.6

(51) Int. Cl.
*G06N 20/00* (2019.01)
*G06F 17/18* (2006.01)
(Continued)

(52) U.S. Cl.
CPC ............. *G06N 20/00* (2019.01); *G06F 17/18* (2013.01); *G06F 18/2178* (2023.01);
(Continued)

(58) Field of Classification Search
CPC ... G06K 9/6259; G06K 9/6269; G06K 9/6263
See application file for complete search history.

(56) References Cited

U.S. PATENT DOCUMENTS

2008/0270478 A1* 10/2008 Liu ...................... G06F 16/583
707/E17.02
2016/0162802 A1  6/2016 Chickering et al.

FOREIGN PATENT DOCUMENTS

CN       101853400      10/2010
CN       102270192      12/2011
(Continued)

OTHER PUBLICATIONS

Leng et al., "Combining active learning and semi-supervised learning to construct SVM classifier," Knowledge-Based Systems, 2013, abstract only.
(Continued)

*Primary Examiner* — Amandeep Saini
*Assistant Examiner* — Raphael Schwartz
(74) *Attorney, Agent, or Firm* — Hodgson Russ LLP

(57) ABSTRACT

The present disclosure proposes a method and an apparatus for recommending sample data. The method may include: inputting a plurality of pieces of sample data to be classified into at least one preset classification model, and acquiring a classifying probability of classifying each piece of sample data into each classification model; acquiring a first distance between each piece of sample data and a classifying boundary of each classification model according to the classifying probability of classifying the piece of sample data into the classification model, in which the classifying boundary of the classification model is configured to distinguish positive and negative sample data; computing a target distance for each piece of sample data according to the first distance between each piece of sample data and the classifying boundary of each classification model.

17 Claims, 3 Drawing Sheets

(51) Int. Cl.
    *G06F 18/2413*     (2023.01)
    *G06F 18/21*     (2023.01)
    *G06F 18/2411*     (2023.01)
    *G06F 18/214*     (2023.01)

(52) U.S. Cl.
    CPC ...... *G06F 18/2411* (2023.01); *G06F 18/2413* (2023.01); *G06F 18/2155* (2023.01)

(56) References Cited

FOREIGN PATENT DOCUMENTS

| | | | | |
|---|---|---|---|---|
| CN | 104318242 | | 1/2015 | |
| CN | 107067025 B | * | 2/2017 | ........... G06K 9/6223 |
| CN | 107067025 | | 8/2017 | |

OTHER PUBLICATIONS

SIPO, First Office Action for CN Application No. 201710854234.6, dated Mar. 3, 2020.

* cited by examiner

METHOD AND APPARATUS FOR RECOMMENDING SAMPLE DATA

CROSS-REFERENCE TO RELATED APPLICATION

The present application is based upon and claims priority to Chinese Patent Application No. 201710854234.6, filed on Sep. 20, 2017, the entirety contents of which are incorporated herein by reference.

FIELD

The present disclosure relates to a field of natural language processing technology, and more particularly to a method and an apparatus for recommending sample data.

BACKGROUND

The machine learning method relies on the quality of the labeling of the trained samples. In order to obtain a better learning effect, high quality manual labeled samples are required.

A large number of manually labeled sample data are used in the training for machine learning methods, and most of these sample data does not have a significant classification effect on the machine learning methods. The data that plays a key role in the classification effect is the sample data at the classifying boundary. By manually labeling the sample data, in order to make the labeled sample data having a correct boundary, it is necessary for the professional to develop a labeling specification, and then organizing a training of labeling personnel. After the sample data is labeled, a cross validation is also required to ensure the quality of the labeled data. To label the boundary of the sample data manually is not only high in labor cost, but also has poor labeling effect.

SUMMARY

Embodiments of the present disclosure seek to solve at least one of the problems existing in the related art to at least some extent.

Accordingly, embodiments of the present disclosure provide a method for recommending sample data, to label using the recommended sample data.

Embodiments of the present disclosure provide an apparatus for recommending sample data.

Embodiments of the present disclosure provide a non-transitory computer-readable storage medium.

In order to achieve the above objectives, embodiments of the present disclosure provide a method for recommending sample data. The method may include: inputting a plurality of pieces of sample data to be classified into at least one preset classification model, and acquiring a classifying probability of classifying each piece of sample data into each classification model; acquiring a first distance between each piece of sample data and a classifying boundary of each classification model according to the classifying probability of classifying the piece of sample data into the classification model, in which the classifying boundary of the classification model is configured to distinguish positive and negative sample data; computing a target distance for each piece of sample data according to the first distance between each piece of sample data and the classifying boundary of each classification model; and selecting target sample data to be recommended from the plurality of pieces of sample data to be classified according to the target distance for each piece of sample data.

In order to achieve the above objectives, embodiments of the present disclosure provide an apparatus for recommending sample data. The apparatus may include: one or more processors; a memory storing instructions executable by the one or more processors; in which the one or more processors are configured to: input a plurality of pieces of sample data to be classified into at least one preset classification model, and to acquire a classifying probability of classifying each piece of sample data into each classification model; acquire a first distance between each piece of sample data and a classifying boundary of each classification model according to the classifying probability of classifying the piece of sample data into the classification model, in which the classifying boundary of the classification model is configured to distinguish positive and negative sample data; compute a target distance for each piece of sample data according to the first distance between each piece of sample data and the classifying boundary of each classification model; and select target sample data to be recommended from the plurality of pieces of sample data to be classified according to the target distance for each piece of sample data.

In order to achieve the above objectives, embodiments of the present disclosure provide a non-transitory computer-readable storage medium having a computer program stored thereon, in which when the computer program is executed by a processor, the processor is caused to perform the method for recommending sample data according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Figure 1:
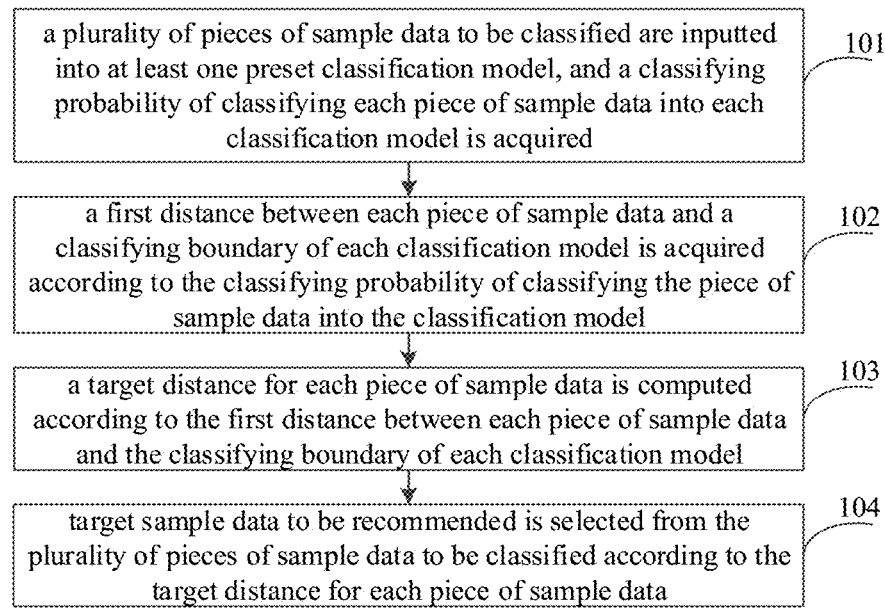
FIG. 1 is a flow chart of a method for recommending sample data according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A method and an apparatus for recommending sample data according to embodiments of the present disclosure will be described with reference to drawings.

FIG. 1 is a flow chart of a method for recommending sample data according to an embodiment of the present disclosure.

As illustrated in FIG. 1, the method may include followings.

At block 101, a plurality of pieces of sample data to be classified are inputted into at least one preset classification model, and a classifying probability of classifying each piece of sample data into each classification model is acquired.

In embodiments of the present disclosure, the plurality of pieces of sample data to be classified is a plurality of pieces of sample data that needs to be classified. The plurality of pieces of sample data to be classified are unlabeled sample data. The at least one preset classification model is pre-trained, and may be, for example, a domain classification model, an intent classification model, and/or a slot classification model, and the like.

In this embodiment, since the at least one preset classification model is a pre-trained classification model, the plurality of pieces of sample data to be classified are input into the at least one preset classification model, and the classifying probability of classifying each piece of sample data into each classification model may be acquired.

At block 102, a first distance between each piece of sample data and a classifying boundary of each classification model is acquired according to the classifying probability of classifying the piece of sample data into the classification model.

The classifying boundary of the classification model is configured to distinguish positive and negative sample data.

It should be noted that, a large number of manually labeled sample data are used in the training for machine learning methods, and most of these sample data does not have a significant classification effect on the machine learning methods. The data that plays a key role in the classification effect is the sample data at the classifying boundary. The sample data at the classifying boundary plays a key role for optimizing the classifying boundary and improving classifying effect.

Since the data that plays a key role in the classification effect is the sample data at the classifying boundary, in this embodiment, the classifying boundary of each classification model may be determined, such that the first distance between each piece of sample data and a classifying boundary of each classification model is acquired according to the classifying boundary of each classification model.

Figure 2:
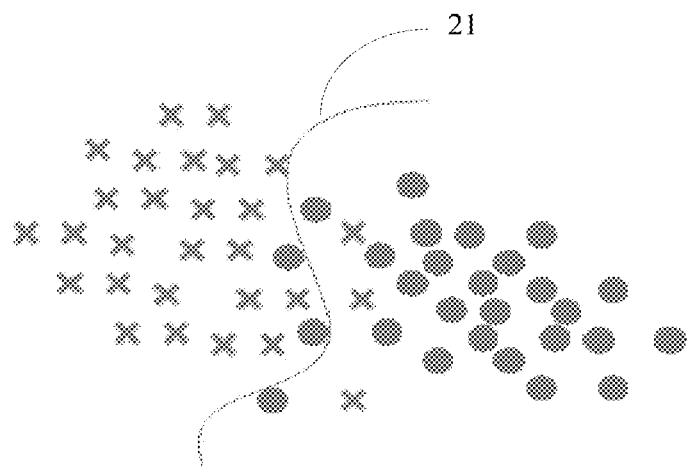
FIG. 2 is a schematic diagram illustrating a classifying boundary of a classification model according to an embodiment of the present disclosure.

As an example, referring to FIG. 2, FIG. 2 is a schematic diagram illustrating a classifying boundary of a classification model according to an embodiment of the present disclosure, in which dots represent positive sample data, crosses represent negative sample data, and the curve represents the classifying boundary of the classification model. The positive sample data and negative sample data located near the classifying boundary have a significant effect on the classification effect.

As a possible implementation, in this embodiment, for each classification model, a first distance between each piece of sample data and the classifying boundary of each classification model according to the classifying probability of classifying the piece of sample data into the classification model and a first preset formula. The first preset formula may be represented as follows.

$$d_i^n = v_i^n - p_i^n \quad (1)$$

where $d_i^n$ represents a first distance between the sample data i and the classifying boundary of the classification model n, $v_i^n$ represents a boundary probability of the classifying boundary of the classification model n, and $p_i^n$ represents a classifying probability of classifying the sample data i into the classification model n.

For example, when the classification model n is the domain classification model, the classifying probability of classifying the sample data i into the domain classification model is 0.4, i.e., $p_i^n$ is 0.4, and the boundary probability of the classifying boundary of the domain classification model is 0.5 (i.e., the negative sample data for a probability greater than 0.5 and the positive sample data for a probability smaller than or equal to 0.5), i.e., $v_i^n$ is 0.5. Therefore, the first distance between the sample data i and the classifying boundary of the classification model n is computed to be 0.1 by subtracting the classifying probability $p_i^n$ from the boundary probability $v_i^n$ using the formula (1).

In an embodiment, the first distance between each piece of sample data and a classifying boundary of each classification model may also be acquired using other algorithms, which will not be limited herein.

At block 103, a target distance for each piece of sample data is computed according to the first distance between each piece of sample data and the classifying boundary of each classification model.

In embodiments of the present disclosure, by actively learning for a plurality of classification models, an optimized effect may be acquired by combining results of multiple classification models. Since the weights of the classification models are different, a weighted distance method may be used to obtain the target distance of each piece of sample data in the specific implementation.

Specifically, the weight of each classification model may be obtained, in which a sum of the weights of all the classification models is equal to 1.

$$\Sigma_{n=1}^{N} w^n = 1 \quad (2)$$

where $w^n$ represents a weight of the classification model n, and N represents the number of the classification models.

After the weight of each classification model is acquired, the first distance is multiplied by the weight for each classification model to acquire the first data, and the first data of classification models are added up to acquire the target distance of the sample data.

$$D_i = \Sigma_{n=1}^{N} w^n * d_i^n \quad (3)$$

where $D_i$ represents a target distance for the sample data i.

For example, when there are three preset classification models including the domain classification model, the intent classification model, and the slot classification model, it may be acquired that $D_i = \Sigma_{n=1}^{3} w^n * d_i^n$ and $\Sigma_{n=1}^{3} w^n = 1$.

In an embodiment, the target distance for each piece of sample data may also be acquired using other algorithms, which will not be limited herein.

At block 104, target sample data to be recommended is selected from the plurality of pieces of sample data to be classified according to the target distance for each piece of sample data.

In this embodiment, after the target distance for each piece of sample data is computed, the target sample data to be recommended may be selected from the plurality of pieces of sample data to be classified according to the target distance for each piece of sample data.

It can be understood that the smaller the $D_i$ at block 103, the closer the distance between the sample data i and the classifying boundary of the classification model, the more necessary for manually labeling. Therefore, in this embodiment, the target distances of sample data may be sorted in ascending order, and some pieces of sample data may be selected from the plurality of pieces of sample data as the target sample data to be recommended according to the sorting result. As the recommended sample data is ranked first, which is convenient for manual labeling, such that the number of manual-labeled data may be effectively reduced, thereby reducing the labeling cost and improving the labeling efficiency. In addition, since the recommended sample data is closer to the classification boundary, the identifying effect of the classification model may be effectively optimized.

In an embodiment, all sample data may be selected as the target sample data to be recommended, and the recommended sample data may be used for labeling, and the optimized identifying effect may be acquired by combining identified results of multiple classification models.

In the prior art, by recommending sample data with lower confidence level for the classification model, or recommending the sample data for the classification model which obtains different results from multiple training, or recommending the sample data causing the classification model generating significant changes, or labeling sample data with the lowest error rate. In this way, by recommending sample data with lower confidence level for the classification model, it is easy to recommend a large number of sample data in a certain category, leading to that the equilibrium of the sample data ratio is unable to be considered. The methods of recommending the sample data for the classification model which obtains different results from multiple training, recommending the sample data causing the classification model generating significant changes, and labeling sample data with the lowest error rate have a certain randomness, and the implementation processes are complicated, the calculation amounts are large, and it is difficult to be practiced in engineering industry.

However, in embodiments of the present disclosure, according to the target distance for each sample, the target sample data to be recommended is selected from all sample data, the optimized identifying effect may be acquired by combining identified results of multiple classification models. In addition, functions of recommending the sample data of multiple classification models may be supported, the application fields are wide, which can be flexibly expanded, and the implementing manners are simple and easy to be practiced in engineering industry.

With the method for recommending sample data according to embodiments of the present disclosure, a plurality of pieces of sample data to be classified are inputted into at least one preset classification model, and a classifying probability of classifying each piece of sample data into each classification model is acquired. A first distance between each piece of sample data and a classifying boundary of each classification model is acquired according to the classifying probability of classifying the piece of sample data into the classification model, in which the classifying boundary of the classification model is configured to distinguish positive and negative sample data. A target distance for each piece of sample data is computed according to the first distance between each piece of sample data and the classifying boundary of each classification model. Target sample data to be recommended is selected from the plurality of pieces of sample data to be classified according to the target distance for each piece of sample data. Thus, by labelling using the recommended sample data, the amount of manually labeled data may be reduced, the labeling cost may be reduced and the labeled efficiency may be improved, and an optimized identification effect may be obtained by combining identification results from multiple classification models. In addition, functions of recommending the sample data of multiple classification models are supported in the embodiments, the application fields are wide and the implementation manner is easy to be practiced in engineering industry.

Figure 3:
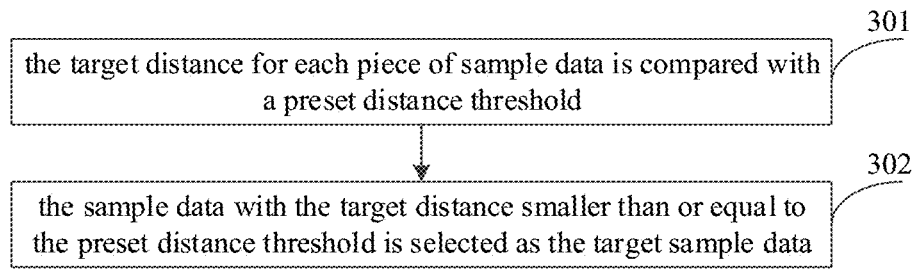
FIG. 3 is a flow chart of a method for recommending sample data according to another embodiment of the present disclosure.

As a possible implementation of embodiments of the present disclosure, referring to FIG. 3, selecting the target sample data to be recommended from the plurality of pieces of sample data to be classified may include followings.

At block 301, the target distance for each piece of sample data is compared with a preset distance threshold.

It can be understood that, as the data that plays a key role in the classification effect is the sample data at the classifying boundary, the preset distance threshold range may be set close to the boundary probability of the classifying boundary of the classification model.

For example, when the boundary probability of the classifying boundary of the classification model is 0.5, the preset distance range may be [0.5−Δ, 0.5+Δ], where Δ may be set manually, for example, Δ may be set as 0.2, and the preset distance range is [0.3, 0.7].

In an embodiment, the target distance for each piece of sample data may be compared with the preset distance threshold range, such that the sample data of which the target distance is or is not within the preset distance threshold range may be acquired.

At block 302, the sample data with the target distance smaller than or equal to the preset distance threshold is selected as the target sample data.

In this embodiment, the selected sample data is within the preset distance threshold range and then is determined as the target sample data, such that the target sample data can be recommended and the recommended target sample data is used for labeling. Therefore, the amount of manually labeled data may be reduced, the labeling cost may be reduced and the labeled efficiency may be improved.

With the method for recommending sample data in this embodiment, the target distance for each piece of sample data is compared with a preset distance threshold, and the sample data with the target distance within the preset distance range is selected as the target sample data. Therefore, the target sample data can be recommended and the recommended target sample data is used for labeling, such that the amount of manually labeled data may be reduced, the labeling cost may be reduced and the labeled efficiency may be improved.

In embodiments of the present disclosure, the weights of the classification models may be adjusted according to different demand of the practical tasks. The above process will be described in detail with reference to FIG. 4.

Figure 4:
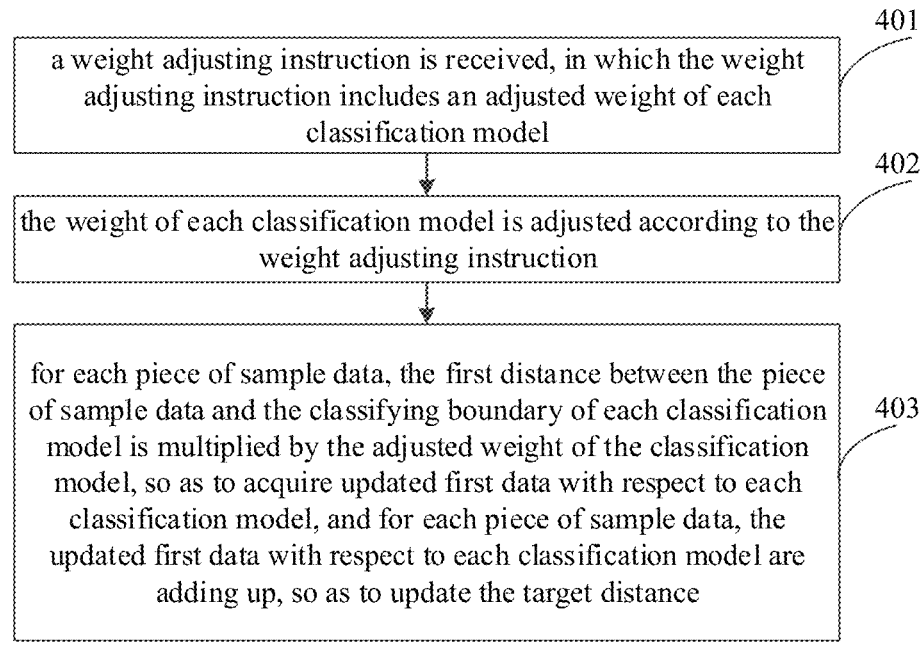
FIG. 4 is a flow chart of a method for recommending sample data according to yet another embodiment of the present disclosure.

FIG. 4 is a flow chart of a method for recommending sample data according to yet another embodiment of the present disclosure.

As illustrated in FIG. 4, the method for recommending sample data may include followings.

At block 401, a weight adjusting instruction is received, in which the weight adjusting instruction includes an adjusted weight of each classification model.

In embodiments of the present disclosure, the weight adjusting instruction may be triggered by a developer. In the specific implementation, the weight of each classification model may be adjusted according to the different demands of the practical task. It can be understood that, the higher the weight of the classification model, the more important the first distance of the classifying boundary of the classification model, the more sample data to be recommended to this classification model.

For example, taking the active learning method in the query parsing task as an example, when to improve the identifying effect of the slot in the query parsing task, the weight of the slot classification model can be increased.

At block 402, the weight of each classification model is adjusted according to the weight adjusting instruction.

As the weight adjusting instruction includes an adjusted weight of each classification model, the weight of each classification model is adjusted according to the weight adjusting instruction in this embodiment.

In this block, the weight of each classification model is adjusted dynamically according to actual demand of the task, such that the flexibility and the applicability of the method may be improved.

At block 403, for each piece of sample data, the first distance between the piece of sample data and the classifying boundary of each classification model is multiplied by the adjusted weight of the classification model, so as to acquire updated first data with respect to each classification model, and for each piece of sample data, the updated first data with respect to each classification model are adding up, so as to update the target distance.

After adjusting the weight of each classification model, the first distance between the piece of sample data and the classifying boundary of each classification model is multiplied by the adjusted weight of the classification model, so as to acquire updated first data with respect to each classification model, and for each piece of sample data, the updated first data with respect to each classification model are adding up, so as to update the target distance, such that the identifying effect of the classification model may be optimized.

With the method for recommending sample data of embodiments of the present disclosure, a weight adjusting instruction is received, in which the weight adjusting instruction includes an adjusted weight of each classification model, the weight of each classification model is adjusted according to the weight adjusting instruction. For each piece of sample data, the first distance between the piece of sample data and the classifying boundary of each classification model is multiplied by the adjusted weight of the classification model, so as to acquire updated first data with respect to each classification model, and for each piece of sample data, the updated first data with respect to each classification model are adding up, so as to update the target distance. Therefore, the weight of each classification model is adjusted dynamically according to actual demand of the task, such that the flexibility and the applicability of the method may be improved. In addition, the target distance may be updated according to the adjusted weight, such that the identifying effect of the classification model may be improved.

In order to implement the above embodiments, embodiments of the present disclosure also provide an apparatus for recommending sample data.

Figure 5:
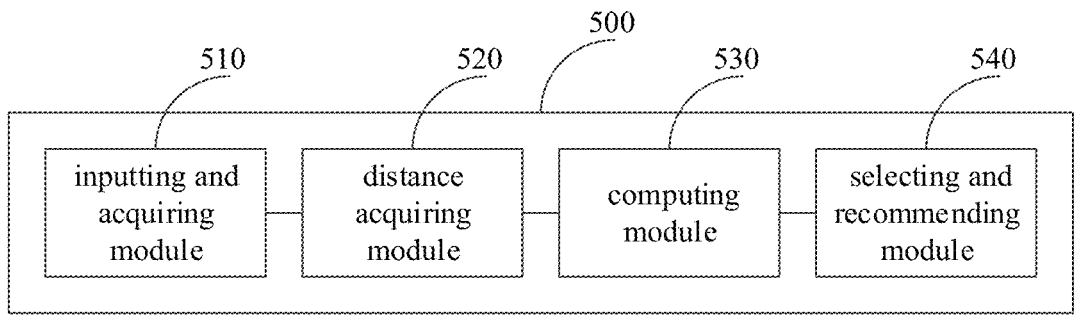
FIG. 5 is a block diagram of an apparatus for recommending sample data according to an embodiment of the present disclosure.

FIG. 5 is a block diagram of an apparatus for recommending sample data according to an embodiment of the present disclosure.

As illustrated in FIG. 5, the apparatus 500 for recommending sample data may include: an inputting and acquiring module 510, a distance acquiring module 520, a computing module 530 and a selecting and recommending module 540.

The inputting and acquiring module 510 is configured to input a plurality of pieces of sample data to be classified into at least one preset classification model, and to acquire a classifying probability of classifying each piece of sample data into each classification model.

The distance acquiring module 520 is configured to acquire a first distance between each piece of sample data and a classifying boundary of each classification model according to the classifying probability of classifying the piece of sample data into the classification model, in which the classifying boundary of the classification model is configured to distinguish positive and negative sample data.

The computing module 530 is configured to compute a target distance for each piece of sample data according to the first distance between each piece of sample data and the classifying boundary of each classification model.

In the specific implementation, the computing module 530 is configured to acquire a weight of each classification model, in which a sum of weights of the at least one preset classification model equal to 1; for each piece of sample data, multiply the first distance between the piece of sample data and the classifying boundary of each classification model by the weight of the classification model, so as to acquire first data with respect to each classification model; and for each piece of sample data, add up the first data with respect to each classification model, so as to acquire the target distance.

The selecting and recommending module 540 is configured to select target sample data to be recommended from the plurality of pieces of sample data to be classified according to the target distance for each piece of sample data.

Figure 6:
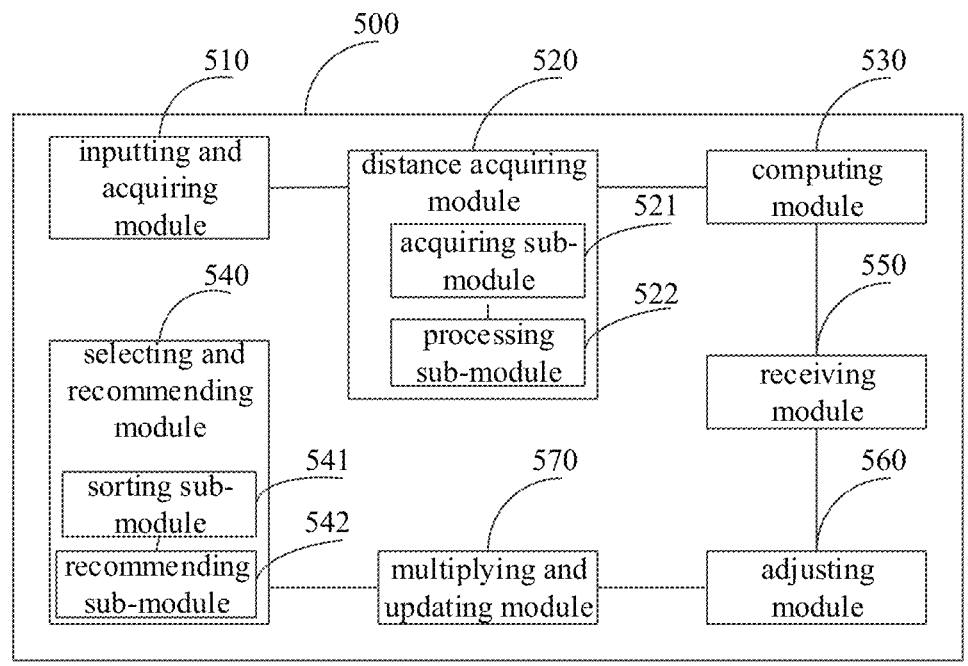
FIG. 6 is a block diagram of an apparatus for recommending sample data according to another embodiment of the present disclosure.

Further, in a possible implementation of embodiments of the present disclosure, on the basis of the embodiment illustrated in FIG. 3, referring to FIG. 6, the apparatus for recommending sample data may also include a receiving module 550, an adjusting module 560 and a multiplying and updating module 570.

The receiving module 550 is configured to receive a weight adjusting instruction after the target distance for each piece of sample data is acquired.

The adjusting module 560 is configured to adjust the weight of each classification model according to the weight adjusting instruction.

The multiplying and updating module 570 is configured to multiply, for each piece of sample data, the first distance between the piece of sample data and the classifying boundary of each classification model by the adjusted weight of the classification model, so as to acquire updated first data with respect to each classification model, and to add up, for each piece of sample data, the updated first data with respect to each classification model, so as to update the target distance.

In the specific implementation, the distance acquiring module 520 may include: an acquiring sub-module 521 and a processing sub-module 522.

The acquiring sub-module 521 is configured to acquire a boundary probability of the classifying boundary of the classification model.

The processing sub-module 522 is configured to subtract the classifying probability of classifying the piece of sample data into the classification model from the boundary probability of the classifying boundary of the classification model, so as to acquire the first distance between the piece of sample data and the classifying boundary of the classification model.

In the specific implementation, the selecting and recommending module 540 may include a sorting sub-module 541 and a recommending sub-module 542.

The sorting sub-module 541 is configured to sort target distances of the plurality of pieces of sample data to be classified in an ascending order.

The recommending sub-module 542 is configured to select the target sample data to be recommended from the plurality of pieces of sample data to be classified according to a sorting result.

In the specific implementation, the recommending sub-module 542 is configured to compare the target distance for each piece of sample data with a preset distance threshold, and to select the sample data with the target distance smaller than or equal to the preset distance threshold as the target sample data.

It should be noted that, the description of the method for recommending sample data in the embodiments illustrated in FIGS. 1-4 is also suitable for the apparatus 500 for recommending sample data in the apparatus embodiments. Details which are not disclosed in the apparatus embodiments will not be described in detail herein.

With the apparatus for recommending sample data according to embodiments of the present disclosure, a plurality of pieces of sample data to be classified are inputted into at least one preset classification model, and a classifying probability of classifying each piece of sample data into each classification model is acquired. A first distance between each piece of sample data and a classifying boundary of each classification model is acquired according to the classifying probability of classifying the piece of sample data into the classification model, in which the classifying boundary of the classification model is configured to distinguish positive and negative sample data. A target distance for each piece of sample data is computed according to the first distance between each piece of sample data and the classifying boundary of each classification model. Target sample data to be recommended is selected from the plurality of pieces of sample data to be classified according to the target distance for each piece of sample data. Thus, by labelling using the recommended sample data, the amount of manually labeled data may be reduced, the labeling cost may be reduced and the labeled efficiency may be improved, and an optimized identification effect may be obtained by combining identification results from multiple classification models. In addition, functions of recommending the sample data of multiple classification models are supported in the embodiments, the application fields are wide and the implementation manner is easy to be practiced in engineering industry.

In order to implement the above embodiments, the present disclosure further provides a computer device.

Figure 7:
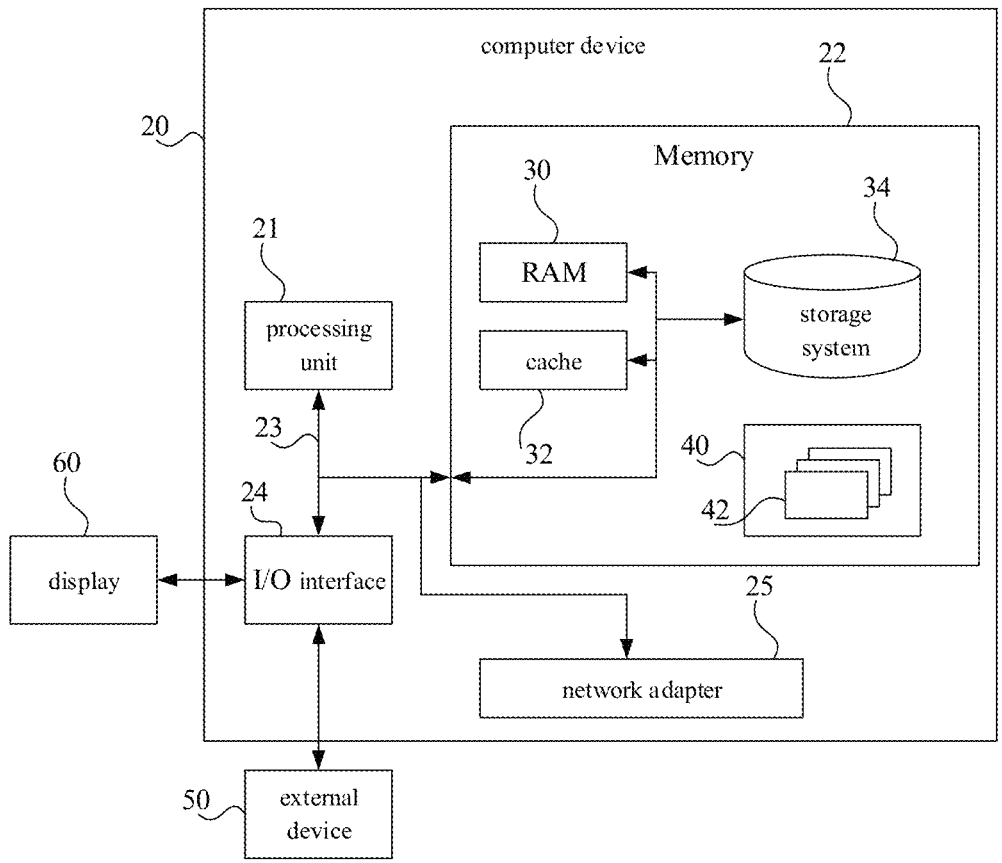
FIG. 7 is a block diagram of a computer device for implementing embodiments of the present disclosure.

FIG. 7 is a block diagram of a computer device 20 for implementing embodiments of the present disclosure. The computer device 20 illustrated in FIG. 7 is merely an example, which should not be understood as a limitation of the functions and application range.

As illustrated in FIG. 7, the computer device 20 is embodied in the form of a general purpose computing device. The components of computer device 20 may include, but are not limited to, one or more processors or processing units 21, a system memory 22, different system components including the system memory 22 and the processing unit 21 may be connected via a bus 23.

The bus 23 represents one or more of several types of bus structures, including a memory bus or memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (MAC) bus, an enhanced ISA bus, and video electronics. The Standards Association (Video Electronics Standards Association; hereinafter referred to as: VESA) local bus and Peripheral Component Interconnection (hereinafter referred to as PCI) bus.

Computer device 20 typically includes a variety of computer system readable media. These media can be any available media that can be accessed by the computer device 20, including both volatile and nonvolatile media, removable and non-removable media.

The system memory 22 may include a computer system readable media in the form of volatile memory, such as random access memory (RAM) 30 and/or cache memory 32. The computer device may further include other removable/non-removable, volatile/non-volatile computer system storage media. For example, the storage system 34 may be used to read and write non-removable, non-volatile magnetic media (not shown in FIG. 7, commonly referred to as "hard disk drives"). Although not shown in FIG. 7, a disk drive for reading and writing to a removable non-volatile disk (such as a "floppy disk"), and a removable non-volatile disk (for example, Compact Disc Read Only Memory (CD-ROM), Digital Video Disc Read Only Memory (DVD-ROM) Or other optical media). In these cases, each drive can be coupled to the bus 23 via one or more data medium interfaces. The memory 22 may include at least one program product having a set (e.g., at least one) of program modules configured to perform the functions of the various embodiments of the present application.

A program/utility 40 having a set (at least one) of program modules 42 may be stored, for example, in memory 22, such program modules 42 including, but not limited to, an operating system, one or more applications, other programs modules and program data, each of these examples or some combination may include an implementation of a network environment. The program module 42 typically performs the functions and/or methods of the embodiments described herein.

The computer device 20 may also be in communication with one or more external devices 50 (e.g., a keyboard, a pointing device, a display 60, etc.), and may also be in communication with one or more devices that enable a user to interact with the computer device 20, and/or any device (e.g., a network card, a modem, etc.) that enables the computer device 20 to communicate with one or more other computing devices. This communication may take place via an input/output (I/O) interface 24. Moreover, the computer device 20 may also communicate to one or more networks through a network adapter 25 (for example, a local area network (LAN), a wide area network (WAN), and/or a public network, such as the Internet). As shown in the figures, the network adapter 25 communicates with other modules of computer device 20 via the bus 23. It should be understood that, although not shown in the figures, other hardware and/or software modules may be utilized in conjunction with computer device 20, including but not limited to: a microcode, a device driver, a redundant processing unit, an external disk drive array, an RAID system, a tape drive and a data backup storage system, etc.

The processing unit 21 executes various function applications and data processing by executing programs stored in the system memory 22, for example, implementing the method for recommending sample data shown in the FIGS. 1-4.

Any combination of one or more computer readable media may be utilized. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the above. More specific examples (non-exhaustive list) of computer readable storage media include: electrical connections with one or more wires, portable computer disks, hard disks, random access memory (RAM), read only memory (ROM), erasable programmable read only memory (EPROM) or flash memory, optical fiber, portable compact disk read only memory (CD-ROM), optical storage device, magnetic memory pieces, or any suitable combination of the above. In this document, a computer readable storage medium can be any tangible medium that can contain or store a program, which can be used by or in connection with an instruction execution system, apparatus, or device.

A computer readable signal medium may include a data signal that is propagated in the baseband or as part of a carrier, in which computer readable program codes are carried. Such propagated data signals may use various forms including, but not limited to, electromagnetic signals, optical signals, or any suitable combination of the foregoing. The computer readable signal medium may also be any computer readable medium other than a computer readable storage medium, which may transmit, propagate, or transport a program for use by or in connection with an instruction execution system, apparatus, or device.

The program codes embodied on the computer readable medium may be transmitted via any suitable medium, including but not limited to wireless, wire, fiber optic cable, RF, etc., or any suitable combination of the foregoing.

The computer program codes for performing the operations of the present application may be written in one or more programming languages, or a combination thereof, including an object oriented programming language such as Java, Smalltalk, C++, and conventional A procedural programming language, such as the "C" language or a similar programming language. The program code may execute entirely or partly on the user's computer, as a stand-alone software package, partly or entirely on the remote computer or server. In the case of a remote computer, the remote computer can be connected to the user computer through any kind of network, including a local area network (LAN) or a wide area network (WAN), or Connect to an external computer (for example, using an Internet service provider to connect via the Internet).

In order to implement the above embodiments, the present disclosure further provides a computer program product, in which when instructions in the computer program product are executed by a processor, the processor is caused to perform the method for recommending sample data according to the above-described embodiments.

In order to implement the above embodiments, the present disclosure further provides a non-transitory computer-readable storage medium having instructions stored thereon, in which when the instructions are executed by a processor, the processor is caused to perform the method for recommending sample data according to the above-described embodiments.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Additionally, those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for recommending sample data, comprising:
    inputting a plurality of pieces of sample data to be classified into at least one preset classification model, and acquiring a classifying probability of classifying each piece of sample data into each classification model;
    acquiring a first distance between each piece of sample data and a classifying boundary of each classification model according to the classifying probability of classifying the piece of sample data into the classification model, wherein the classifying boundary of the classification model is configured to distinguish positive and negative sample data;
    computing a target distance for each piece of sample data according to the first distance between each piece of sample data and the classifying boundary of each classification model and a weight of each classification model; and
    selecting target sample data to be recommended from the plurality of pieces of sample data to be classified according to the target distance for each piece of sample data,
    wherein after acquiring the target distance for each piece of sample data, the method further comprises:
        receiving a weight adjusting instruction, in which the weight adjusting instruction comprises an adjusted weight of each classification model, so as to update the target distance.

2. The method according to claim 1, wherein acquiring the first distance between each pieces of sample data and the classifying boundary of each classification model according to the classifying probability of classifying the piece of sample data into the classification model comprises:
    acquiring a boundary probability of the classifying boundary of the classification model; and
    subtracting the classifying probability of classifying the piece of sample data into the classification model from the boundary probability of the classifying boundary of the classification model, so as to acquire the first distance between the piece of sample data and the classifying boundary of the classification model.

3. The method according to claim 2, wherein computing the target distance for each piece of sample data according to the first distance between each piece of sample data and the classifying boundary of each classification model comprises:
    acquiring the weight of each classification model, in which a sum of weights of the at least one preset classification model equal to 1;
    for each piece of sample data, multiplying the first distance between the piece of sample data and the classifying boundary of each classification model by the weight of the classification model, so as to acquire first data with respect to each classification model; and
    for each piece of sample data, adding up the first data with respect to each classification model, so as to acquire the target distance.

4. The method according to claim 3, wherein after receiving the weight adjusting instruction, the method further comprises:
    adjusting the weight of each classification model according to the weight adjusting instruction;
    for each piece of sample data, multiplying the first distance between the piece of sample data and the classifying boundary of each classification model by the adjusted weight of the classification model, so as to acquire updated first data with respect to each classification model; and
    for each piece of sample data, adding up the updated first data with respect to each classification model, so as to update the target distance.

5. The method according to claim 3, wherein selecting the target sample data to be recommended from the plurality of pieces of sample data to be classified according to the target distance for each piece of sample data comprises:
    sorting target distances of the plurality of pieces of sample data to be classified in an ascending order; and
    selecting the target sample data to be recommended from the plurality of pieces of sample data to be classified according to a sorting result.

6. The method according to claim 2, wherein selecting the target sample data to be recommended from the plurality of pieces of sample data to be classified according to the target distance for each piece of sample data comprises:
    sorting target distances of the plurality of pieces of sample data to be classified in an ascending order; and
    selecting the target sample data to be recommended from the plurality of pieces of sample data to be classified according to a sorting result.

7. The method according to claim 1, wherein selecting the target sample data to be recommended from the plurality of pieces of sample data to be classified according to the target distance for each piece of sample data comprises:
sorting target distances of the plurality of pieces of sample data to be classified in an ascending order; and
selecting the target sample data to be recommended from the plurality of pieces of sample data to be classified according to a sorting result.

8. The method according to claim 7, wherein selecting the target sample data to be recommended from the plurality of pieces of sample data to be classified comprises:
comparing the target distance for each piece of sample data with a preset distance threshold; and
selecting the sample data with the target distance smaller than or equal to the preset distance threshold as the target sample data.

9. An apparatus for recommending sample data, comprising:
one or more processors;
a memory storing instructions executable by the one or more processors;
wherein the one or more processors are configured to:
input a plurality of pieces of sample data to be classified into at least one preset classification model, and to acquire a classifying probability of classifying each piece of sample data into each classification model;
acquire a first distance between each piece of sample data and a classifying boundary of each classification model according to the classifying probability of classifying the piece of sample data into the classification model, wherein the classifying boundary of the classification model is configured to distinguish positive and negative sample data;
compute a target distance for each piece of sample data according to the first distance between each piece of sample data and the classifying boundary of each classification model and a weight of each classification model; and
select target sample data to be recommended from the plurality of pieces of sample data to be classified according to the target distance for each piece of sample data,
wherein the one or more processors are further configured to:
receive a weight adjusting instruction after acquiring the target distance for each piece of sample data, in which the weight adjusting instruction comprises an adjusted weight of each classification model, so as to update the target distance.

10. The apparatus according to claim 9, wherein the one or more processors are configured to:
acquire a boundary probability of the classifying boundary of the classification model; and
subtract the classifying probability of classifying the piece of sample data into the classification model from the boundary probability of the classifying boundary of the classification model, so as to acquire the first distance between the piece of sample data and the classifying boundary of the classification model.

11. The apparatus according to claim 10, wherein the one or more processors are configured to:
acquire the weight of each classification model, in which a sum of weights of the at least one preset classification model equal to 1;
for each piece of sample data, multiply the first distance between the piece of sample data and the classifying boundary of each classification model by the weight of the classification model, so as to acquire first data with respect to each classification model; and
for each piece of sample data, add up the first data with respect to each classification model, so as to acquire the target distance.

12. The apparatus according to claim 11, wherein the one or more processors are configured to:
adjust the weight of each classification model according to the weight adjusting instruction after receiving the weight adjusting instruction;
multiply, for each piece of sample data, the first distance between the piece of sample data and the classifying boundary of each classification model by the adjusted weight of the classification model, so as to acquire updated first data with respect to each classification model, and to add up, for each piece of sample data, the updated first data with respect to each classification model, so as to update the target distance.

13. The apparatus according to claim 11, wherein the one or more processors are configured to:
sort target distances of the plurality of pieces of sample data to be classified in an ascending order; and
select the target sample data to be recommended from the plurality of pieces of sample data to be classified according to a sorting result.

14. The apparatus according to claim 10, wherein the one or more processors are configured to:
sort target distances of the plurality of pieces of sample data to be classified in an ascending order; and
select the target sample data to be recommended from the plurality of pieces of sample data to be classified according to a sorting result.

15. The apparatus according to claim 9, wherein the one or more processors are configured to:
sort target distances of the plurality of pieces of sample data to be classified in an ascending order; and
select the target sample data to be recommended from the plurality of pieces of sample data to be classified according to a sorting result.

16. The method according to claim 15, wherein the one or more processors are configured to:
compare the target distance for each piece of sample data with a preset distance threshold; and
select the sample data with the target distance smaller than or equal to the preset distance threshold as the target sample data.

17. A non-transitory computer-readable storage medium having a computer program stored thereon, wherein when the computer program is executed by a processor, the processor is caused to perform the method for recommending sample data comprising:
inputting a plurality of pieces of sample data to be classified into at least one preset classification model, and acquiring a classifying probability of classifying each piece of sample data into each classification model;
acquiring a first distance between each piece of sample data and a classifying boundary of each classification model according to the classifying probability of classifying the piece of sample data into the classification model, wherein the classifying boundary of the classification model is configured to distinguish positive and negative sample data;
computing a target distance for each piece of sample data according to the first distance between each piece of sample data and the classifying boundary of each classification model and a weight of each classification model; and selecting target sample data to be recommended from the plurality of pieces of sample data to be classified according to the target distance for each piece of sample data, wherein after acquiring the target distance for each piece of sample data, the method further comprises:

receiving a weight adjusting instruction, in which the weight adjusting instruction comprises an adjusted weight of each classification model, so as to update the target distance.

\* \* \* \* \*